United States Patent
Nevalainen et al.

(10) Patent No.: US 10,632,725 B2
(45) Date of Patent: Apr. 28, 2020

(54) METHOD OF PRODUCING A HEAT-RESISTANT POLYMER-COATED OVEN BOARD, AN OVEN BOARD OBTAINABLE BY THE METHOD, A FOOD TRAY AND A FOOD PACKAGE

(71) Applicant: STORA ENSO OYJ, Helsinki (FI)

(72) Inventors: Kimmo Nevalainen, Kotka (FI); Ville Ribu, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 261 days.

(21) Appl. No.: 15/304,172

(22) PCT Filed: Apr. 14, 2015

(86) PCT No.: PCT/IB2015/052710
§ 371 (c)(1),
(2) Date: Oct. 14, 2016

(87) PCT Pub. No.: WO2015/159217
PCT Pub. Date: Oct. 22, 2015

(65) Prior Publication Data
US 2017/0028701 A1    Feb. 2, 2017

(30) Foreign Application Priority Data
Apr. 16, 2014 (SE) .................................... 1400205

(51) Int. Cl.
*B32B 7/00* (2019.01)
*B32B 37/15* (2006.01)
(Continued)

(52) U.S. Cl.
CPC ........ *B32B 37/153* (2013.01); *B29C 48/0021* (2019.02); *B29C 48/156* (2019.02);
(Continued)

(58) Field of Classification Search
CPC .... B29C 47/0064; B32B 37/153; B32B 27/10
See application file for complete search history.

(56) References Cited

U.S. PATENT DOCUMENTS 4,559,257 A * 12/1985 Nilsson .................. B29C 51/14
428/152
4,900,594 A    2/1990 Quick et al.
(Continued)

FOREIGN PATENT DOCUMENTS

EP    0215630 A2    3/1987
EP    0245005 A2    11/1987
(Continued)

OTHER PUBLICATIONS

International Searching Authority, International Search Report, PCT/IB2015/052710, dated Aug. 24, 2015.
(Continued)

*Primary Examiner* — James D Sells
(74) *Attorney, Agent, or Firm* — Greer, Burns & Crain Ltd.

(57) ABSTRACT

The invention covers a method of producing a heat-resistant polymer-coated oven board, the resulting oven board, a food tray and a food package, which comprise such board and withstand heating in a range or microwave oven. According to the invention the coated oven board (1) is made by adhering a premade heat-resisting film (4) comprising polyethylene terephthalate (PET) or its derivate, such as glycol-modified PET known as PETG, to a board base (2) by extrusion lamination, in which an adhesive layer (3) comprising polyamide (PA) is extruded between the heat-resisting film and the board base. To improve the strength and barrier properties, the film (4) may be an extruded multilayer film and/or the film may be stretch-orientated to bring about crystallization in PET.

10 Claims, 1 Drawing Sheet

(51) Int. Cl.
| | |
|---|---|
| *B32B 27/08* | (2006.01) |
| *B32B 37/20* | (2006.01) |
| *B65D 81/34* | (2006.01) |
| *B32B 7/12* | (2006.01) |
| *B32B 27/34* | (2006.01) |
| *B32B 27/36* | (2006.01) |
| *B32B 37/14* | (2006.01) |
| *B29C 48/21* | (2019.01) |
| *B29C 48/00* | (2019.01) |
| *B29C 48/156* | (2019.01) |
| *B32B 7/02* | (2019.01) |
| *B32B 27/10* | (2006.01) |
| *B29K 667/00* | (2006.01) |
| *B29L 9/00* | (2006.01) |
| *B29L 7/00* | (2006.01) |
| *B29L 31/00* | (2006.01) |
| *B29K 105/00* | (2006.01) |
| *B29K 77/00* | (2006.01) |
| *B29C 48/88* | (2019.01) |

(52) U.S. Cl.
CPC ............. *B29C 48/21* (2019.02); *B32B 7/02* (2013.01); *B32B 7/12* (2013.01); *B32B 27/08* (2013.01); *B32B 27/10* (2013.01); *B32B 27/34* (2013.01); *B32B 27/36* (2013.01); *B32B 37/14* (2013.01); *B32B 37/203* (2013.01); *B65D 81/343* (2013.01); *B65D 81/3453* (2013.01); *B29C 48/914* (2019.02); *B29K 2077/00* (2013.01); *B29K 2105/0097* (2013.01); *B29K 2667/003* (2013.01); *B29L 2007/008* (2013.01); *B29L 2009/00* (2013.01); *B29L 2009/005* (2013.01); *B29L 2031/712* (2013.01); *B32B 2270/00* (2013.01); *B32B 2307/306* (2013.01); *B32B 2307/718* (2013.01); *B32B 2307/7242* (2013.01); *B32B 2307/7244* (2013.01); *B32B 2317/12* (2013.01); *B32B 2367/00* (2013.01); *B32B 2377/00* (2013.01); *B32B 2439/70* (2013.01)

(56) References Cited

U.S. PATENT DOCUMENTS

| | | | |
|---|---|---|---|
| 5,968,647 | A | 10/1999 | Adur et al. |
| 6,030,477 | A | 2/2000 | Olvey |
| 6,068,897 | A | 5/2000 | Adur et al. |
| 2005/0227087 | A1* | 10/2005 | Burgmeier ............... B32B 7/12 428/423.1 |
| 2010/0323134 | A1 | 12/2010 | Bostian et al. |
| 2013/0193026 | A1* | 8/2013 | Kauri .................... B32B 27/10 206/524.2 |

FOREIGN PATENT DOCUMENTS

| | | | | |
|---|---|---|---|---|
| EP | 0931646 | A2 | 7/1999 | |
| EP | 2103541 | A1 | 9/2009 | |
| EP | 2222462 | B1 * | 8/2013 | ............ B32B 27/10 |
| JP | 2006321183 | | 11/2006 | |
| JP | 2011506221 | | 3/2011 | |
| WO | 0026025 | A1 | 5/2000 | |
| WO | 0139968 | A1 | 6/2001 | |
| WO | 2009080891 | A1 | 7/2009 | |

OTHER PUBLICATIONS

Rosato, D.V., Extruding Plastics, A practical processing handbook, Chapman & Hall, 1998, pp. 441-468.

* cited by examiner

METHOD OF PRODUCING A HEAT-RESISTANT POLYMER-COATED OVEN BOARD, AN OVEN BOARD OBTAINABLE BY THE METHOD, A FOOD TRAY AND A FOOD PACKAGE

This application is a U.S. National Stage under 35 U.S.C. § 371 of International Application No. PCT/IB2015/052710, filed Apr. 14, 2015, which claims priority to Swedish application No. 1400205-9 filed Apr. 16, 2014.

FIELD OF INVENTION

The invention relates to a method of producing a heat-resistant polymer-coated oven board, as well as to an oven board, which is obtainable by the method. Furthermore, the invention relates to a food tray and an oxygen impermeable food package, which withstand heating in an oven.

BACKGROUND OF THE INVENTION

A food packaging material requires being vapour and gas impermeable in order to achieve sufficient preservability of the product. In addition, the properties of the package may include that the product can be heated in a range or microwave oven. To meet these requirements, the board used for food package is usually coated at least from one side with one or several polymer layers so that the different layers provide different function in the board and the finished package. Due to its high melting temperature of about 250° C., polyethylene terephthalate (PET) has been the preferred polymer material for the coating of oven boards.

EP 2 222 462 B1 discloses a polymer-coated oven board which contains an oxygen barrier layer of polyamide (PA) and a surface layer of polyethylene terephthalate (PET) adhered to it, the layers having been applied onto the board by means of coextrusion, i.e. by extruding melts of the polymers and applied onto the board from a die. PA is aimed to strengthen the structure and to remedy the insufficient gas barrier lent by PET.

However, the prior art extrusion technique involves a number of limitations. According to said EP 2 222 462 B1 the weight of an extruded PET coating layer shall be 20 to 50 g/m², preferably 30 to 40 g/m². This technique thus requires a thickish PET layer for achieving sufficient bonding to the underlying PA layer in the coextrusion process. Thinning down the PET layer would result in failure of bonding with PA. Good adhesion between extruded PET and other polymer layers could be achieved by means of an intermediate tie-resin layer (e.g. modified ethylene acrylate resins like Bynell 22E804 from DuPont), but unfortunately such tie-resins lack sufficient heat resistance to be applicable for dual-ovenable food packaging.

Extruded PET coating layers do not crystallize, which is a further disadvantage in view of the barrier properties. An overmost thick PET layer also has a tendency of cracking at the bends and corners as the coated board is turned to trays and packages.

The problem thus is to find an improved technique for manufacturing an oven board, which fulfills the requirement of heat-resistance and a sufficient vapor and gas barrier, while avoiding the risk of cracking as the board is turned to trays or containers, and bringing saving of polymer material by reducing the required thickness of the PET coating layer.

SUMMARY OF THE INVENTION

According to the invention the above problems are solved by a novel method of producing polymer-coated ovenable board, in which a heat-resisting film comprising polyethylene terephthalate (PET) or its derivate is adhered to a fibrous board base by extrusion lamination, in which an adhesive layer comprising polyamide (PA) is extruded between the heat-resisting film and the board base.

In the following any reference to PET in general also covers PET derivates, which have substantially similar heat-withstanding properties and ovenability.

In the invention the extruded PA layer is acting as a bonding medium to bond the premade solid PET film to the board base. Compared to a coextruded PET layer, use of a premade film in accordance with the invention gives rise to a number of improved properties.

Thus the heat-resisting PET film may be stretch-orientated before being adjoined with extruded PA at the extrusion lamination step. Stretching brings about crystallization and thereby increased strength and improved gas barrier properties.

The film may have a high degree of crystallization, which also improves the gas barrier, and may be provided with added polymeric or inorganic coatings to lend it various functionality or otherwise tailor its properties. For instance, the film may be metallized on its outside, forming the surface of the final product with greatly improved gas, grease and aroma barrier properties. Other treatments, such as corona treatment, would improve bonding of the film to the underlying PA layer.

The PET film may also have a multilayer polymer structure of its own, produced by coextrusion. As compared to monolayers a multilayer film has generally an improved mechanical strength. Various PET grades or derivates may be bonded in coextrusion as very thin layers so that the total film thickness may be kept in check.

In particular, the premade PET film allows the polymer grammage be reduced by up to about 50%. According to the invention the weight of the PET film layer against the adhesive PA layer (7) may be in the range of 10 to 30 g/m², preferably 10 to 20 g/m². The weight of the adhesive PA layer may be 3-15 g/m², preferably 5-10 g/m².

At its simplest, the coating may be a double-layer coating consisting of the extruded adhesive PA layer adhered to the board base and the heat-resisting PET film, adhered to the PA layer and forming the surface layer of the product.

Depending on the end use there may be a polymer coating on one side of the board base only, or the board base may be similarly coated on its both sides.

The PA used may be of a special grade to facilitate adhesion to the board base and bonding to PET. Use of various derivates of PA, including blends of different PA grades and polyimides with substantially similar properties, are covered by the invention. Also covered are blends of PA with other polymers, such as PET, provided that PA is the major component having a share of more than 50% in the blend. Fillers such as $CaCO_3$, or oxygen scavengers may be included in the PA layer. PA grades such as PA6 (Nylon 6) and MXD6 (Nylon MXD6) may be used in the invention. A preferred material is high-barrier polyamide (HBPA), sold under trade name Grivory HB 5299. HBPA has superior barrier properties as compared to PET and has no tendency of cracking when bended or creased.

Instead of an extruded single PA layer the adhesive layer may be a coextruded multilayer structure having PA or PA blend layers on both sides adjacent to the board base and to the premade film. Examples of such structures are PA6/MXD6, PA6/HBPA, HPBA/MXD6 and PA6/PGA/PA6 (PGA=polyglycolic acid). Thus polymers other than PA, which stand oven temperatures and adhere to PA layers in extrusion, may be included as a middle layer in the coextruded structure.

The PET derivates comprised by the invention include in particular glycolmodified polyethylene terephthalate (PETG). The heat-resistant film may comprise PET and/or PETG. PETG has the advantage of being amorphic, so that it fills the wrinkles and corrugations as the coated board is pressed into trays and thus allows gas tight sealing as a tray package is closed with a heat-sealed lid. The film may comprise, or consist of, a plurality of coextruded layers of PET and PETG. In stretch-orientation PET will crystallize and add to the strength and the barrier, while PETG as a surface layer remains amorphic and secures superior bonding at the tray corners and gas-tight sealing to the lid. Furthermore, the film may include an innermost PA layer, which is easy to bond tightly to the extruded adhesive PA layer at the extrusion lamination step.

The polymer-coated board product according to the invention, which withstands oven temperatures and is obtainable by the method as described above, is characterised in that the coating comprises an extruded inner layer, which comprises polyamide (PA) and is directly adhered to a board base, and an outer heat-resisting mono- or multilayer film comprising polyethylene terephthalate (PET) or its derivate, said film being directly adhered to the inner PA layer, the weight of the inner PA layer being 3-15 g/m$^2$ and the weight of the outer heat-resisting film being 10-30 g/m$^2$.

Preferably the heat-resisting film is a stretch-oriented film. Instead of, or in addition to PET the film may advantageously comprise PETG. Advantageously the extruded PA layer comprises MXD6 and/or HBPA.

The ovenable food tray according to the invention comprises an oven board as described above, positioned so that there are superimposed polymer layers at least on the inner surface of the tray.

The food package according to the invention, which is heat-sealed so as to be oxygen tight and heatable in a range or microwave oven, comprises an oven board as described above, so that the superimposed polymer coating layers are located at least on the inside of the board base in the package.

BRIEF DESCRIPTION OF THE DRAWINGS

The invention is illustrated by means of examples, with reference to the attached drawings, in which.

DETAILED DESCRIPTION

Figure 1:
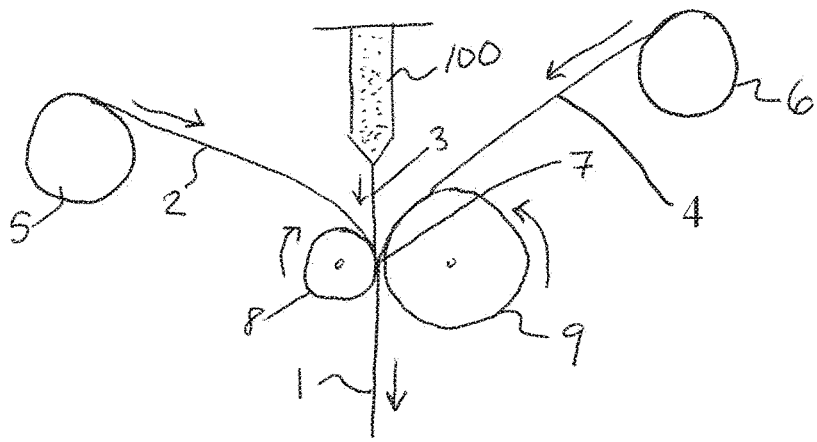
FIG. 1 shows manufacture of a polymer-coated board according to the invention.

FIG. 1 shows a process according to the invention for manufacturing an ovenable coated packaging board 1, which comprises a board base, and inner coating layer of polyamide (PA) and an outer coating layer of polyethylene terephthalate (PET). The process is one of extrusion lamination, in which a layer 3 of melted PA is extruded between a board base 2 and a premade solid PET film 4 to form a bond between the same. The film 4 may be a monolayer or multilayer film, and may be stretch-orientated before incorporation into the board product 1.

According to FIG. 1 a web of paperboard 2 and a web of PET film 4 are drawn from respective rolls 5, 6 to a nip 7 formed by a drive roll 8 and a chill roll 9, and PA melt 3 is extruded from a nozzle 100 to meet the board and film webs 2, 4 at the nip 7. The chill roll 9 cools the melted PA, and the rolls 8, 9 together press the layers 2, 3, 4 to form the finished board product 1.

Figure 2:
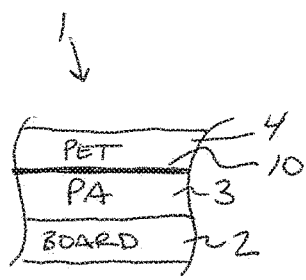
FIGS. 2 to 6 show examples of coated board structures according to the invention.

FIG. 2 shows the structure of the board product 1 made in accordance with the process of FIG. 1 at its simplest. The board base 2 has an inner coating layer 3 of PA and an outer coating layer 4 of PET. In the figure the borderline 10 between the extruded inner layer 3 and the outer film layer 4 has been emphasized merely for the sake of illustration; in practice there is a smooth adhesive bonding between the layers 3, 4.

Figure 3:
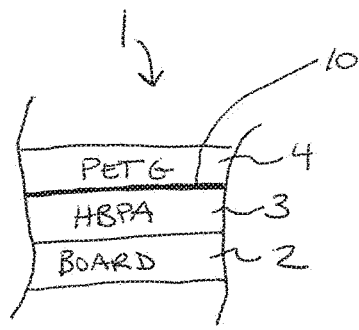

FIG. 3 corresponds to FIG. 2 but shows HBPA and PETG as alternative materials for the extruded and premade film layers 3, 4. Of course combining PA with PETG or HDPA with PET for the two layers 3, 4 is also possible.

The weight of the paperboard base 2 may vary in the range of about 120 to 250 g/m$^2$. Use of a heavier cardboard for the base 2 is also possible. The board base 2 may comprise chemical or mechanical pulp or combinations of the same, usually as a multilayer structure customary to the art.

The weight of the extruded adhesive layer 3 may vary in the range of about 3 to 15 g/m$^2$, preferably 5 to 10 g/m$^2$. The weight of the outer film layer 4 may vary in the range of about 10 to 30 g/m$^2$, preferably 10 to 20 g/m$^2$.

Figure 4:
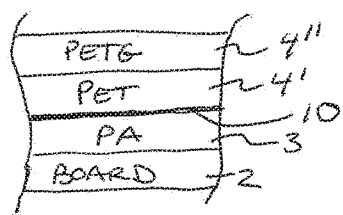

FIG. 4 shows an embodiment according to the invention, in which the premade outer film consists of two layers 4', 4" bonded to each other. The materials of the film are PET and PETG. PETG has better moldability, and therefore forms the outermost layer 4" in the finished product. The combined weight of the film layers 4', 4" preferably fits within the above range of about 10 to 30 g/m$^2$.

Even the material according to FIG. 4 has been manufactured in the manner shown in FIG. 1. The film has been prepared by coextrusion of the PET and PETG layers and solidifying the film, for subsequent use in the process of the present invention.

Figure 5:
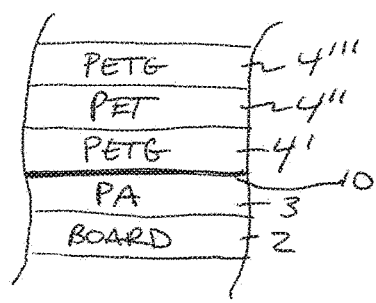

FIG. 5 shows a further embodiment according to the invention, in which the premade outer film consists of three layers 4', 4", 4''' bonded to each other. The materials of the film layers are PETG, PET and PETG in this order.

Figure 6:
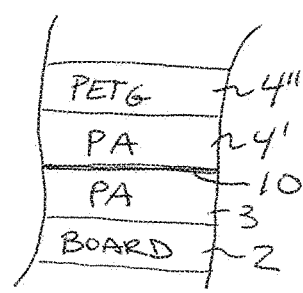

FIG. 6 shows a still further embodiment according to the invention, in which the premade outer film consists of layers 4', 4" of PA and PETG. PA bonds excellently to the extruded innermost PA layer 3, and PETG forms the preferred material for the outer surface of the coated board.

The coating layers are principally designed to form the contact layer with food in a food tray or container, and withstand heating in a range or microwave oven. The coated board may thus be formed to food trays, in which there is coating at least on the inner food-contact side of the tray, or sealed food containers, in which there is coating at least on the food-contacting inner surface of the container. However, it may be desirable to provide similar coating also to the outside of the tray or container.

The invention claimed is:

1. A method of producing a polymer-coated oven board, comprising:
    adhering a pre-made solid heat-resisting film comprising polyethylene terephthalate (PET) or its derivate and having a weight of 10-20 g/m$^2$ to a board base by extrusion lamination,
    in which an adhesive layer comprising a molten polyamide (PA) is extruded between the pre-made solid heat-resisting film and the board base.

2. The method of claim 1, wherein the polymer-coated oven board forms a surface layer of the product.

3. The method of claim 1, wherein the board base is similarly coated on its both sides.

4. The method of claim 1, wherein the adhesive layer comprises high-barrier polyamide (HBPA).

5. The method of claim 1, wherein the weight of the adhesive layer is 3-15 g/m$^2$.

6. The method of claim 1, wherein the heat-resisting film comprises PET, PETG, or both.

7. The method of claim 6, wherein the heat-resisting film comprises of a plurality of coextruded layers of PET and PETG.

8. The method of claim 6, wherein the heat-resisting film includes an innermost PA layer, which is adhered to the extruded adhesive PA layer at the extrusion lamination step.

9. The method of claim 1, wherein the heat-resisting film is stretched before the extrusion lamination step.

10. The method of claim 1, wherein the weight of the adhesive layer is 5-10 g/m$^2$.

\* \* \* \* \*